United States Patent
Depelsenaire

(10) Patent No.: US 7,232,407 B2
(45) Date of Patent: Jun. 19, 2007

(54) METHOD FOR INERTING MINERAL RESIDUES

(75) Inventor: Guy Depelsenaire, Court-Saint-Etienne (BE)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 10/495,128

(22) PCT Filed: Nov. 20, 2002

(86) PCT No.: PCT/FR02/13322

§ 371 (c)(1),
(2), (4) Date: May 20, 2004

(87) PCT Pub. No.: WO03/043752

PCT Pub. Date: May 30, 2003

(65) Prior Publication Data

US 2005/0033105 A1 Feb. 10, 2005

(30) Foreign Application Priority Data

Nov. 21, 2001 (FR) .................................. 01 15143

(51) Int. Cl.
*B09B 3/00* (2006.01)
*A62D 3/00* (2006.01)
(52) U.S. Cl. ..................................... 588/256
(58) Field of Classification Search ............... 588/256, 588/257, 318, 321, 252
See application file for complete search history.

(56) References Cited

U.S. PATENT DOCUMENTS

| 3,947,283 | A | | 3/1976 | Uchikawa et al. |
| 4,737,356 | A | | 4/1988 | O'Hara et al. |
| 5,037,286 | A | | 8/1991 | Roberts |
| 5,037,479 | A | | 8/1991 | Stanforth |
| 6,086,000 | A | * | 7/2000 | Murata ..................... 241/19 |
| 6,132,355 | A | * | 10/2000 | Derie ..................... 588/257 |
| 2004/0112842 | A1 | | 6/2004 | Depelsenaire et al. |
| 2005/0033105 | A1 | | 2/2005 | Depelsenaire |

FOREIGN PATENT DOCUMENTS

| EP | 534 231 | | 3/1993 |
| EP | 572 813 | | 12/1993 |
| JP | 09122620 A | * | 5/1997 |
| JP | 2001-79513 | | 3/2001 |
| JP | 2001-121105 | | 5/2001 |
| WO | 92/16262 | | 10/1992 |
| WO | 97/31874 | | 9/1997 |
| WO | 02/32817 | | 4/2002 |

OTHER PUBLICATIONS

U.S. Appl. No. 11/578,147, filed Oct. 10, 2006, Depelsenaire.*
U.S. Appl. No. 10/495,128, filed May 20, 2004, Depelsenaire.*
U.S. Appl. No. 11/578,147, filed Oct. 10, 2006, Depelsenaire.

* cited by examiner

*Primary Examiner*—John Kreck
(74) *Attorney, Agent, or Firm*—Oblon, Spivak, McClelland, Maier & Neustadt, P.C.

(57) ABSTRACT

Method of inerting mineral residues comprising automobile grinding residues, in which method water is added to the mineral residues so as to form a paste, the paste is mixed with phosphoric acid, and the resulting mixture is calcined.

20 Claims, No Drawings

METHOD FOR INERTING MINERAL RESIDUES

This application is a National Stage application of PCT/EP02/13322, filed Nov. 20, 2002. Priority to French application 01/15143, filed Nov. 21, 2001, is claimed.

The present invention relates to a method of inerting mineral residues. More particularly, it relates to a method of inerting automobile grinding residues.

The expression <<inerting a residue >> is understood to mean a treatment after which the toxic substances that the residue contains are immobilized therein and no longer present a risk of contaminating the environment.

The ever increasing quantities of scrapped motor vehicles (SMVs) pose serious problems as regards the removal of the residues that result therefrom.

National legislation imposes substantial levels of recovery and recycling of the constituent materials of motor vehicles. To meet these requirements, it is common practice for the motor vehicles to be ground up, so as to allow the metals, mainly ferrous metals, to be separated and recovered. However, the residues that remain after this recovery, commonly called AGRs (automobile grinding residues), still represent about 25% of the weight of the original vehicle. These residues comprise organic, often toxic, substances and heavy metals. These toxic substances are liable to contaminate the environment, in particular by being leached, if they are not sufficiently immobilized in the residue.

There are various standardized tests that any residue must pass for the purpose of utilizing it or even for dumping it.

Automobile grinding residues do not in general pass these tests. In particular, the quantities of chromium (VI) and lead that are detectable in leachates greatly exceed the imposed standards. These residues must therefore undergo a prior inerting treatment.

A known method for inerting automobile grinding residues consists in subjecting them to a vitrification heat treatment carried out at high temperature, of around 1300° C.

However, this known method has the disadvantage of volatilising a substantial portion of the heavy metals contained in the treated residue. It is consequently necessary to purify the flue gases resulting from the said treatment. Moreover, the high temperatures used in this known treatment mean that a large amount of energy is consumed.

The invention aims to remedy the aforementioned drawbacks by providing a simple and inexpensive method of inerting automobile grinding residues that makes these residues innocuous so as to allow them to be utilized or dumped.

Consequently, the invention relates to a method of inerting mineral residues comprising automobile grinding residues, in which method water is added to the mineral residues so as to form a paste, the paste is mixed with phosphoric acid, and the resulting mixture undergoes a calcination operation.

According to the invention, the mineral residues comprise automobile grinding residues. In general, they comprise more than 35% by weight often more than 50%, thereof. They may also comprise residues from domestic electrical appliances, such as refrigerators and cookers, these also being ground. Finally, the mineral residues may comprise residues coming from various collection points, for example those resulting from the demolition of buildings.

The mineral residues subjected to the treatment according to the invention are composed of fragments, generally with a particle size of less than 5 mm. However, certain fragments of the fibrous type do have a length that sometimes reaches 10 mm, but the mean particle size is less than 5 mm.

In an advantageous way of implementing the method according to the invention, the mineral residues are ground in such a way that their mean particle size is less than 2 mm, preferably between 0.5 and 1.5 mm.

The fragments are highly heterogeneous, namely metal fragments and fragments of glass, plastic, wood, textile, etc., the whole assembly being embedded in an indistinct mass that contains hydrocarbons. The hydrocarbon content of the mineral residues is usually between 10 and 20% by weight. The bulk density of the residue is ordinarily less than 1. The water content of the residue, determined by volumetry using the Karl Fischer method, is generally between 3 and 5%.

The mineral residues subjected to the inerting according to the invention contain little calcium carbonate—its content is generally less than 6% by weight. Frequently, the calcium carbonate content of the mineral residues is less than 4%. However, it is preferably greater than 1%.

The mineral residues subjected to the method according to the invention contain heavy metals. The term <<heavy metals >> is understood to mean metals whose density is at least equal to 5 g/cm$^3$, and also beryllium, arsenic, selenium and antimony, in accordance with the generally accepted definition (Heavy Metals in Wastewater and Sludge Treatment Processes; Vol I, CRC Press Inc, 1987; p. 2).

According to the invention, water is added to the mineral residues in order to convert them into a paste. The word <<paste >> is understood here in the rheological sense, denoting a viscous liquid. The amount of water to be added depends on the initial water content of the residue. It is advantageous to add an amount of water such that the paste obtained contains between 20 and 50% by weight of water, which in the majority of cases corresponds to an addition of 15 to 47% by weight of water.

The paste obtained is then mixed with phosphoric acid. It is very suitable for the amount of phosphoric acid to be between 5 and 20% by weight of the mineral residues to be treated. However, this amount is preferably greater than 7%, but advantageously less than 15%. The water and the phosphoric acid are added with stirring. Any stirring and mixing technique can be used. Plough mixers or the use of an endless screw give good results.

The resulting mixture is subjected to a calcination operation. The calcination is carried out at a temperature above 500° C. for a sufficient time, so that the organic materials are correctly destroyed. Advantageously, the calcination temperature remains below 1000° C., in order to prevent the volatilisation of heavy metals.

In a first preferred way of implementing the method according to the invention, the calcination temperature is between 630 and 680° C. This method of implementation provides a treated residue that retains a pulverulent texture.

In a second preferred way of implementing the method according to the invention, the calcination temperature is between 730 and 780° C. In this method of implementation, the texture of the residue is more massive, but remains pliable.

In a third preferred way of implementing the method according to the invention, the calcination temperature is between 830 and 900° C. In this method of implementation, a treated residue is obtained that is partly vitrified and has good mechanical strength.

In certain cases and for certain applications, it may prove worthwhile to add a hydraulic binder to the treated residue and, where appropriate, water in order to cause the binder to set. The final product obtained may then have remarkable mechanical properties.

Surprisingly, it has been observed that the mineral residues comprising automobile grinding residues, despite their low calcium carbonate content, give rise, during the calcination, to the formation of calcium pyrophosphate. Without wishing to be held by any theoretical explanation, the inventor believes that this calcium pyrophosphate is a heavy-metal trap.

The examples described below will bring out the benefit of the invention.

First Series of Trials

This series of trials started with what are called "heavy" grinding residues. These are residues collected directly downstream of the grinder.

EXAMPLE 1

Not According to the Invention

Mineral residues having the following composition were treated:

| Element | % by weight |
|---------|-------------|
| Cd | 0.0026 |
| Cr | 0.06 |
| Cu | 0.54 |
| Fe | 10.3 |
| Ni | 0.11 |
| Pb | 0.73 |
| Zn | 1.8 |
| $CaCO_3$ | 3.1 |

The mineral residues were mixed with 20% water by means of an endless screw at room temperature and then calcined for 2 hours at 620° C., starting with a cold furnace, with a forced circulation of air.

The resulting product was subjected to the triple leaching test described in French Standard NFX 31-210. The test protocol consists in grinding the material so that it can pass through a 4 mm screen. This ground material is subjected to triple leaching with demineralized water, in a liquid/solid ratio of 10, with constant stirring. After each leaching, the heavy-metal content of the liquid for washing the powder subjected to the test is measured.

The results obtained were the following:

| 1st Leaching | | | 2nd Leaching | | | 3rd Leaching | | |
|---|---|---|---|---|---|---|---|---|
| pH | Cr (VI) (mg/l) | Pb (mg/l) | pH | Cr (VI) (mg/l) | Pb (mg/l) | pH | Cr (VI) (mg/l) | Pb (mg/l) |
| 11.6 | 3.9 | 16 | 11.2 | 1.0 | <0.03 | 11.0 | 1.7 | <0.03 |

EXAMPLE 2

According to the Invention

The procedure was as in the previous example except that 10% phosphoric acid was mixed with the residue, also by means of an endless screw, before its calcination.

The results of the leaching test were the following:

| 1st Leaching | | | 2nd Leaching | | | 3rd Leaching | | |
|---|---|---|---|---|---|---|---|---|
| pH | Cr (VI) (mg/l) | Pb (mg/l) | pH | Cr (VI) (mg/l) | Pb (mg/l) | pH | Cr (VI) (mg/l) | Pb (mg/l) |
| 9.3 | 0.08 | <0.03 | 10.1 | <0.002 | <0.03 | 9.9 | <0.002 | <0.03 |

Second Series of Trials

This series of trials started with what are called <<light>> grinding residues. These residues are collected indirectly, in the form of <<dust>> emitted into the atmosphere during the grinding operation.

EXAMPLE 3

According to the Invention

The procedure was as in the previous example, except that the calcination was carried out at 875° C. and the initial composition of the residue to be treated was as follows:

| Element | % by weight |
|---------|-------------|
| Cd | 0.003 |
| Cr | 0.065 |
| Cu | 0.47 |
| Fe | (not measured) |
| Ni | 0.07 |
| Pb | 1.41 |
| Zn | 2.2 |

The results of the leaching test were the following:

| 1st Leaching | | | 2nd Leaching | | | 3rd Leaching | | |
|---|---|---|---|---|---|---|---|---|
| pH | Cr (VI) (mg/l) | Pb (mg/l) | pH | Cr (VI) (mg/l) | Pb (mg/l) | pH | Cr (VI) (mg/l) | Pb (mg/l) |
| 11.3 | <0.002 | <0.03 | 10.8 | <0.002 | <0.03 | 10.9 | <0.002 | <0.03 |

These examples illustrate the surprising inerting effect obtained by the method according to the invention, despite the very low calcium carbonate content of the mineral residue.

The invention claimed is:

1. A method of inerting mineral residues comprising automobile grinding residues, comprising adding water to the mineral residues so as to form a paste, mixing the paste with phosphoric acid to form a resultant mixture, and subjecting the resultant mixture to a calcination operation, wherein said mineral residues comprise a positive amount of calcium carbonate in an amount less than 6% by weight and wherein said calcination operation forms calcium pyrophosphate.

2. The method according to claim 1, wherein the mean particle size of the mineral residues is between 0.5 and 1.5 mm.

3. The method according to claim 2, wherein the amount of phosphoric acid mixed is between 5 and 20%.

4. The method according to claim 3, wherein the amount of phosphoric acid mixed is between 7 and 15%.

5. The method according to claim 2, wherein the amount of phosphoric acid mixed is between 7 and 15%, the calcination is carried out at a temperature between 630 and 680° C., and comprising adding water in an amount such that the paste obtained contains between 15 and 47% by weight water.

6. The method according to claim 2, wherein the amount of phosphoric acid mixed is between 7 and 15%, the calcination is carried out at a temperature between 730 and 780° C., and comprising adding water in an amount such that the paste obtained contains between 15 and 47% by weight water.

7. The method according to claim 2, the amount of phosphoric acid mixed is between 7 and 15%, the calcination is carried out at a temperature between 830 and 900° C., and comprising adding water in an amount such that the paste obtained contains between 15 and 47% by weight water.

8. The method according to claim 1, wherein the amount of phosphoric acid mixed is between 5 and 20%.

9. The method according to claim 8, wherein the amount of phosphoric acid mixed is between 7 and 15%.

10. The method according to claim 1, wherein the calcination is carried out at a temperature between 630 and 680° C.

11. The method according to claim 1, wherein the calcination is carried out at a temperature between 730 and 780° C.

12. The method according to claim 1, wherein the calcination is carried out at a temperature between 830 and 900° C.

13. The method according to claim 1, comprising adding water in an amount such that the paste obtained contains between 20 and 50% by weight water.

14. The method according to claim 1, comprising adding water in an amount such that the paste obtained contains between 15 and 47% by weight water.

15. The method according to claim 1, wherein said mineral residues comprise from less than 6% to greater than 1% by weight calcium carbonate.

16. The method according to claim 1, wherein said mineral residues comprise less than 4% by weight calcium carbonate.

17. The method according to claim 1, wherein said mineral residues comprise from less than 4% to greater than 1% by weight calcium carbonate.

18. The method according to claim 1, wherein the amount of phosphoric acid mixed is between 7 and 15%, the calcination is carried out at a temperature between 630 and 680° C., and comprising adding water in an amount such that the paste obtained contains between 15 and 47% by weight water.

19. The method according to claim 1, wherein the amount of phosphoric acid mixed is between 7 and 15%, the calcination is carried out at a temperature between 730 and 780° C., and comprising adding water in an amount such that the paste obtained contains between 15 and 47% by weight water.

20. The method according to claim 1, wherein the amount of phosphoric acid mixed is between 7 and 15%, the calcination is carried out at a temperature between 830 and 900° C., and comprising adding water in an amount such that the paste obtained contains between 15 and 47% by weight water.

* * * * *

UNITED STATES PATENT AND TRADEMARK OFFICE
CERTIFICATE OF CORRECTION

PATENT NO. : 7,232,407 B2 Page 1 of 1
APPLICATION NO. : 10/495128
DATED : June 19, 2007
INVENTOR(S) : Guy Depelsenaire It is certified that error appears in the above-identified patent and that said Letters Patent is hereby corrected as shown below:

Title page, item [57]
ABSTRACT, line 3, " to form a paste, the paste is "
        should read -- to form a paste. The paste is --.

Column 4, line 64, " according to claim 2, wherein "
        should read -- according to claim 1, wherein --.

Signed and Sealed this

Twenty-third Day of October, 2007

JON W. DUDAS
*Director of the United States Patent and Trademark Office*